May 8, 1951   E. Y. SPROUSE   2,551,910
TAKE-UP LET-BACK MECHANISM FOR LOOMS
Filed March 31, 1949

INVENTOR.
ERSTON Y. SPROUSE
BY
ATTORNEY

Patented May 8, 1951

2,551,910

UNITED STATES PATENT OFFICE 2,551,910

TAKE-UP LET-BACK MECHANISM FOR LOOMS

Erston Young Sprouse, Gaffney, S. C., assignor of one-half to Oscar N. Melton, Gaffney, S. C.

Application March 31, 1949, Serial No. 84,595

5 Claims. (Cl. 139—313)

The present invention relates to take-up let-back mechanism for power looms.

In accordance with the present invention, the let-back mechanism will let back the take-up gears one or more picks when the loom is stopped. The warp and cloth accordingly are slightly slackened to compensate for the over-running of the loom due to inertia, so that when the loom again is started, a thin place will not be formed in the fabric. The let-back mechanism is constructed to positively retain the let-back pawl in engagement with the toothed wheel of the gearing, during the let-back period, thereby preventing the improper separation of the let-back pawl and the toothed wheel, which results in the formation of a thick portion in the cloth. The let-back mechanism also retains the let-back pawl out of engagement with the toothed wheel of the take-up gearing during the normal operation of the loom, eliminating the tripping of the let-back pawl over the toothed wheel, which results in wearing of the contacting parts. The let-back mechanism is adjustable for accurate operation.

Figure 1:
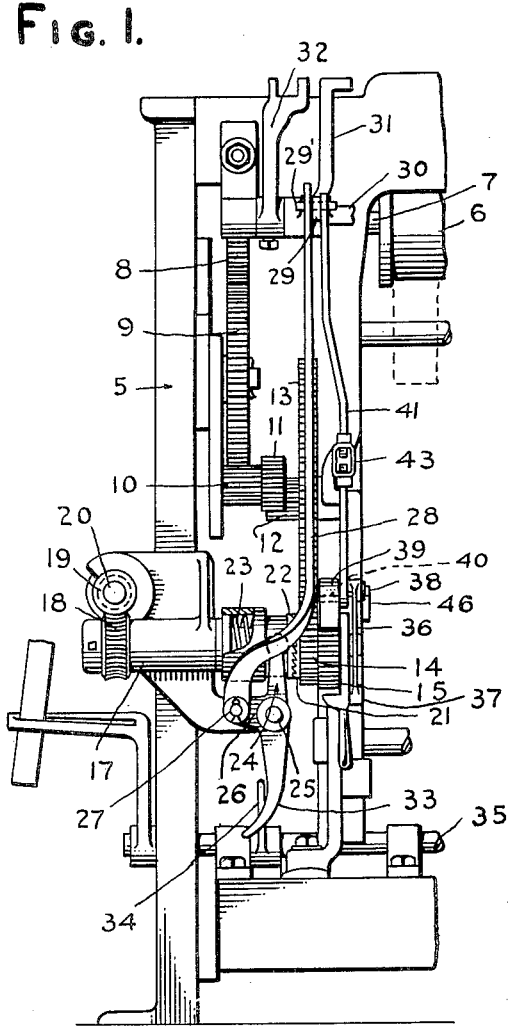
Figure 2:
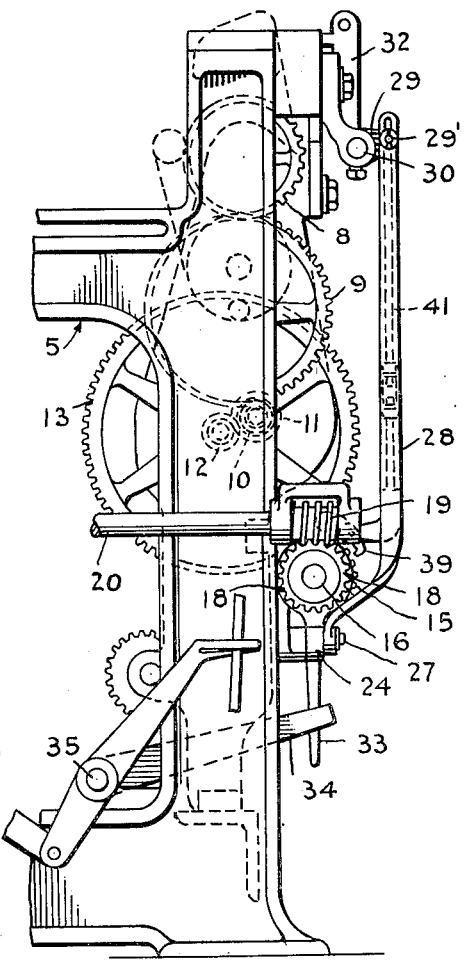
Figure 3:
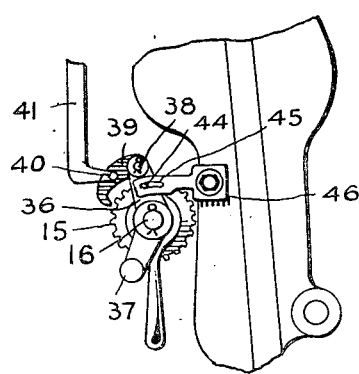

In the accompanying drawings, forming a part of this application, and in which like numerals are employed to designate like parts throughout the same, Figure 1 is a front elevation of the take-up let-back mechanism embodying my invention, Figure 2 is a side elevation of the same, and, Figure 3 is a side elevation of the let-back pawl and associated elements.

In the drawings, wherein for the purpose of illustration is shown a preferred embodiment of my invention, the numeral 5 designates the frame-side of a loom frame in the upper portion of which is arranged a take-up roll 6, carried by a shaft 7 suitably journaled in the loom frame. This shaft is turned by a train of take-up speed reducing gears including a gear 8 rigidly mounted upon the shaft 7, engaging a gear 9 in turn engaging a small gear 10. This small gear 10 is rigidly secured to a large gear 11 for rotation therewith, engaging a small gear 12, rigidly secured to a large gear 13. The large gear 13 is engaged and driven by a small gear 14 having a toothed wheel 15 rigidly secured thereto. The small gear 14 is rotatably mounted upon a horizontal shaft 16 journaled in a fixed bearing 17.

A worm wheel 18 is rigidly mounted upon a shaft 16 and this worm wheel is driven by a worm 19, mounted upon a shaft 20.

The gear 14 is rotatable upon the shaft 16, as stated, and a clutch device is provided to lock and unlock the gear 14 with and from the shaft 16. This clutch device includes a toothed clutch element 21 rigidly secured to the gear 14 and a co-acting toothed clutch element 22 rotatable with the shaft 16 and movable longitudinally thereof and forced into engagement with the clutch element 21 by a spring 23. When the clutch element 22 disengages the clutch element 21, the gear 14 is idle upon the shaft 16.

The numeral 24 designates a yoke mounted upon a fixed pivot 25 and engaging the clutch element 22 to shift it axially in opposition to the spring 23. This yoke has a lateral extension or crank 26, pivotally connected at 27 with a rod 28, extending upwardly for a slotted pivotal connection with a crank 29, pivotally mounted upon a rock shaft 30 journaled in fixed bearings. The slotted pivotal connection includes a pivot 29'. The crank 29 has an upstanding arm or crank 31, and this arm 31 is swung outwardly by the movement of the usual filling fork slide (not shown) when filling absence is detected. When the arm 31 is swung outwardly, the rod 28 is moved downwardly and the clutch rendered inactive. The rock shaft 30 is turned to effect automatic filling replenishment in any well known manner and the turning of the rock shaft is effected by a filling feeler mechanism acting through an arm 32 fast upon the rock shaft, when the filling in the running shuttle is exhausted to a predetermined extent.

The yoke 24 has a depending cam extension 33, to be engaged and shifted by a radial crank 34 mounted upon a horizontal rock shaft 35 which is turned by the warp stop motion, when a warp fault occurs.

The foregoing construction is conventional and is substantially the same as disclosed in Patent 913,915 and patents referred to therein.

Pivotally mounted upon the shaft 16 and disposed adjacent to the inner end of the toothed wheel 15 is a vertically swinging lever 36 provided at its lower end with a weight 37 so that the lever is normally retained upright. Secured to the upper end of the lever 36 is a pin 38 upon which is pivoted a let-back pawl 39, arranged above the toothed wheel 15 to engage and disengage the same. Pivotally connected with the pawl 39 is a link 41. This link has a lower reduced end bent to form a horizontal extension 40, pivoted in an opening formed in the pawl 39, and held in position by a cotter pin. The upper end of the link 41 is positively pivotally mounted upon the pivot 29' which is sufficiently long for this purpose. The link 41 has a turnbuckle 43 connected therein so that the link may have its length adjusted. When the loom is operating during the weaving period under normal conditions and the crank 31 is in the inner normal position the link 41 is raised and the let-back pawl 39 is retained out of engagement with the toothed wheel 15 and remains out of such engagement during such normal weaving period. The lever 36 has a pin 44 rigidly secured thereto operating within an elongated slot 45 formed in a fixed bracket 46. The pin controls the extent of let-back movement of the let-back pawl 39 when the pawl engages the toothed wheel 15, so that the take-up gears may be let back one or more picks when the loom is stopped. The usual adjustable means may be employed whereby the pin 44 may move throughout the entire length of the slot 45 or a portion thereof, as desired. The arrangement of the pivoted lever 36 and the stop means for regulating its let-back movement is conventional.

The operation of the mechanism is as follows: When the loom is in operation during the normal weaving period, the crank 29 remains raised or horizontal, and the clutch elements 21 and 22 engage and the gear 14 turns with the shaft 16 and the train of gears is driven and the take-up roll 6 is turned. During this operation, the link 41 is elevated and the let-back pawl 39 remains out of engagement with the toothed wheel 15. This dispenses with the tripping action of the let-back pawl with the toothed wheel, during the driving of the take-up roll 6, as occurs with the conventional loom. When the loom is stopped due to a filling failure or detection, the rod 28 moves downwardly to render the clutch inactive and the link 41 also moves downwardly and brings the let-back pawl 39 into engagement with the toothed wheel 15. This let-back pawl therefore engages the toothed wheel while the clutch is open or inactive and will permit the take-up gears to let back one or more picks, depending upon the extent of movement of the pin 44 in the slot 45. This prevents the formation of a thin portion in the fabric due to the overrunning of the loom by inertia. When the let-back pawl 39 is brought into engagement with the toothed wheel 15 to effect the let-back of the take-up gears and the take-up roll 6, the link 41 positively retains the let-back pawl in engagement with the toothed wheel, whereby a thick portion cannot be formed in the fabric, which may occur in the conventional loom since the let-back pawl in the conventional loom frequently improperly disengages the toothed wheel during the letting back of the take-up gears. The take-up roll 6 may be let-back for only one pick, two picks, or three picks. This movement is very slight, and the toothed wheel 15 is turned for a correspondingly short distance, since the movement of the pin 44 will be properly limited in the slot 45. The pawl 39 will move clockwise with the toothed wheel 15, Figure 3, and the link 41 will swing upon its pivot 29' and move with the pawl 39. The lower end of the link 41 will swing upwardly slightly without the link 41 moving upwardly bodily. This reduces any upward movement of the link 41, caused by the action of the pawl 39, traveling with the toothed wheel 15 while in engagement therewith. When the link moves downwardly so the pawl 39 is brought into engagement with the toothed wheel 15 and held in such engagement, the rod 28 also moves downwardly and renders the clutch inactive by shifting the clutch element 22 out of engagement with the clutch element 21. If the link 41 rises slightly during the let-back turning movement of the take-up roll 6, the upward movement of link 41 and rod 28 is not sufficient to cause clutch element 22 to reengage the clutch element 21, and hence the let-back action will properly occur. If there is a tendency of the clutch element 22 to reengage the clutch element 21, before the completion of the let-back action, the turn-buckle 43 will be adjusted to shorten the link 41 and this will raise the pawl 39, requiring link 40 and rod 28 to move downwardly a greater distance, to bring pawl 39 in engagement with the toothed wheel 15, and the rod 28 will then move the clutch element 22 a greater distance from the clutch element 21, whereby these clutch elements will remain out of engagement during the let-back action.

It is to be understood that the form of my invention herewith shown and described is to be taken as a preferred example of the same, and that various changes in the shape, size and arrangements of parts may be resorted to, without departing from the spirit of my invention or the scope of the subjoined claims.

Having thus described my invention, I claim:

1. In a power loom, the combination with take-up mechanism including a toothed wheel, actuating means connected with the take-up mechanism to drive it including a clutch to be rendered active and inactive, a let-back device including a pivoted pawl arranged near the toothed wheel, means connected with the clutch to render the clutch inactive upon the stoppage of the loom due to filling failure, and means connected with the pawl and timed in operation with respect to the last named means to hold the let-back pawl out of engagement with the toothed wheel when the clutch is active and to hold the let-back pawl in engagement with the toothed wheel during the let back period when the clutch is inactive.

2. In a power loom, the combination with take-up mechanism including a toothed wheel, actuating means connected with the take-up mechanism to drive it including a clutch to be rendered active and inactive, a let-back device including a pivoted pawl arranged near the toothed wheel, means including a reciprocatory element connected with the clutch to render the clutch inactive upon the stoppage of the loom due to filling failure, and mechanical means connected with the pawl and connected with the reciprocatory element and serving to hold the let-back pawl out of engagement with the toothed wheel when the clutch is active and to hold the let-back pawl in engagement with the toothed wheel during the let-back period when the clutch is inactive.

3. In a power loom, the combination with take-up mechanism including a toothed wheel, actuating means connected with the take-up mechanism to drive it including a clutch to be rendered active and inactive, a let-back device including a pivoted support, a pawl pivotally mounted upon the pivoted support and arranged near the toothed wheel, means connected with the clutch to render the clutch inactive upon the stoppage of the loom due to filling failure including a reciprocatory element, and a link connected with the reciprocatory element and connected with the pawl and serving to hold the pawl out of engagement with the toothed wheel when the link is raised and the clutch is active and to lower the pawl into engagement with the toothed wheel and positively retain the pawl in such engagement when the link is lowered and the clutch is inactive during the let-back period.

4. In a power loom, the combination with take-up mechanism including a toothed wheel, actuating means connected with the take-up mechanism to drive it including a clutch to be rendered active and inactive, a let-back device including a pivoted support, a pawl pivotally mounted upon the pivoted support and arranged near the toothed wheel, stop means to limit the let-back movement of the pawl when it engages the toothed wheel, means connected with the clutch to render the clutch inactive upon the stoppage of the loom due to filling failure, and operating means connected with the pawl and timed in operation with respect to the last named means to hold the pawl out of engagement with the toothed wheel when the clutch is active and to move the pawl into engagement with the toothed wheel when the clutch is inactive and positively retain the pawl in such engagement while the clutch is inactive during the let-back period.

5. In a power loom, the combination with take-up mechanism including a toothed wheel, actuating means connected with the take-up mechanism to drive it including a clutch comprising clutch elements, a let-back device including a pivoted support, a pawl pivotally mounted upon the pivoted support and arranged near the toothed wheel, a pivoted lever operated upon filling failure, a link connected with the lever and connected with the pawl, adjustable means to regulate the effective length of the link, the link serving to hold the pawl out of engagement with the toothed wheel when the pivoted lever is in the inactive position and to move the pawl into engagement with the toothed wheel and retain the pawl in such engagement when the lever is moved to the active position due to filling failure, a movable shifting element engaging one clutch element to move it out of engagement with the other clutch element, and a rod connecting the movable shifting element and the lever so that the clutch is rendered inactive upon filling failure.

ERSTON YOUNG SPROUSE.

REFERENCES CITED

The following references are of record in the file of this patent:

UNITED STATES PATENTS

| Number | Name | Date |
| --- | --- | --- |
| 748,262 | Caswell | Dec. 29, 1903 |
| 913,915 | Rhoades | Mar. 2, 1909 |
| 1,794,420 | Robellard | Mar. 3, 1931 |